UNITED STATES PATENT OFFICE.

EDUARD MÜNCH, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

THIOSALICYLIC COMPOUND AND PROCESS OF MAKING SAME.

943,561. Specification of Letters Patent. Patented Dec. 14, 1909.

No Drawing. Application filed September 1, 1908. Serial No. 451,250.

*To all whom it may concern:*

Be it known that I, EDUARD MÜNCH, doctor of philosophy and chemist, a subject of the Grand Duke of Baden, residing at Ludwigshafen-on-the-Rhine, in the country of Germany, have invented new and useful Improvements in Thiosalicylic Compounds and Processes of Making the Same, of which the following is a specification.

I have discovered that trichlorethylene, or tribromethylene, can be made to react on thiosalicylic acid compounds, thereby yielding compounds which, by suitable treatment, can be condensed to form leuco compounds of thioindigo coloring matters. Under the term "thiosalicylic acid compounds" I include thiosalicylic acid itself and also homologues and analogues thereof and derivatives of any of these compounds, for instance dithiosalicylic acid, sulfocyanbenzoic acid, xanthogen-benzoic acid, and the sulfurized benzoic acid derivatives, obtainable by treating the corresponding ortho-diazobenzoic acid compounds with alkali polysulfid.

The reaction between trihalogen-ethylene and the thiosalicylic acid compound should always be carried out in the presence of sufficient metal to combine with at least one halogen atom of the trihalogen-ethylene employed. This can be brought about for instance in the case of thiosalicylic acid itself by employing the potassium salt thereof, in which case the reaction can be represented by the equation:

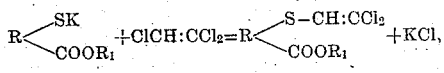

where R represents a benzene, or a naphthalene, residue, and may be substituted, while $R_1$ represents a metal or an alkyl, including alphyl and aryl group. When such a compound as the diethylester of dithiosalicylic acid, which cannot form a metallic salt is employed, the metal necessary can be added in the form of for instance caustic potash. The reaction is preferably carried out in the presence of a solvent and in some cases proceeds better when a slight excess of free alkali above the quantity before stated be present. I term the compounds so obtained omega-dihalogen-vinyl-thiosalicylic acid compounds.

My new compounds are characterized by the following properties. They are colorless or only slightly colored, are easily soluble in alcohol and in benzene, more difficultly soluble in ligroin and very difficultly soluble in water. On treatment with an alkaline condensing agent they yield leuco compounds of thioindigo coloring matters. I do not, however, claim such production of leuco compounds in this application, since this forms the subject matter of Patent No. 910839, January 26, 1909.

The following examples will serve to illustrate further the nature of my invention and how it can be carried into practical effect, but it is not confined to these examples. The parts are by weight and the temperatures are given in degrees centigrade.

Example 1: Heat a solution of fifteen and two-fifths (15.4) parts of thiosalicylic acid and twelve and two-fifths (12.4) parts of caustic potash in fifty (50) parts of methylated spirits on the water-bath, and add thirteen (13) parts of trichlorethylene. Boil the whole for about eight (8) hours in a reflux apparatus, take up with water and precipate with hydrochloric acid, whereupon omega-dichlor-vinyl-thiosalicylic acid is obtained and can be recrystallized from benzene, yielding colorless crystals which melt at one hundred and seventy-three (173) degrees.

Example 2: Heat a solution of thirty-eight and one-fifth (38.2) parts of potassium dithiosalicylate and twelve and two-fifths (12.4) parts of caustic potash in one hundred (100) parts of methylated spirits in a reflux apparatus on the water-bath and add, slowly, drop by drop, twenty-six (26) parts of trichlorethylene. Heat for from six (6), to eight (8), hours, distil off the greater part of the methylated spirits, take up the residue with water and precipitate the omega-dichlor-vinyl-thiosalicylic acid by means of hydrochloric acid.

Example 3: Heat a solution of twenty-three and three-tenths (23.3) parts of para-bromthiosalicylic acid in a quantity of alcoholic potash containing eleven and one-fifth (11.2) parts of caustic potash, on the water-bath, and add thirteen (13) parts of trichlorethylene. Then continue heating for several hours, dilute with water, and precipitate by means of hydrochloric acid. The omega-dichlor-vinyl-para-brom-thiosalicylic acid can be recrystallized from benzene yielding colorless crystals which melt at one hundred and eighty-eight (188) degrees.

Example 4: Dissolve, in eighty (80) parts of dilute alcohol, eleven and one-fifth (11.2) parts of caustic potash, and the sulfurized benzoic acid derivative obtainable by diazotizing fourteen (14) parts of anthranilic acid and reacting on the diazo compound with three and one-half (3.5) parts of sulfur and twenty-seven (27) parts of crystallized sodium sulfid, then add thirteen and one-half (13.5) parts of trichlorethylene and heat the whole for eight (8) hours in a reflux apparatus, dilute the product with water, and precipitate the omega-dichlor-vinyl-thiosalicylic acid by means of acid.

Example 5: Heat together in an autoclave, for three (3) hours, at from one hundred and twenty (120), to one hundred and forty (140), degrees, forty-four (44) parts of the potassium salt of ethyl-thiosalicylate, one hundred (100) parts of alcohol, and twenty-seven (27) parts of trichlorethylene. Then distil off the alcohol and extract the ethyl ester of omega-dichlor-vinyl-thiosalicylic acid from the residue by means of ether. The ester consists of a light brown viscous oil and is easily soluble in alcohol and in benzene.

Example 6: Dissolve twenty-eight and three-fifths (28.6) parts of 4-ethoxy-2-xanthogen benzoic acid in a solution of eighteen (18) parts of potassium hydroxid in one hundred (100) parts of alcohol, add fourteen (14) parts of trichlorethylene and boil the whole in a reflux apparatus on the water-bath for about four (4) hours. Then add a little water and distil off the alcohol, acidify the residue, filter off the precipitate and wash and dry it at a moderate temperature. On crystallizing it from benzene and ligroin, meta-ethoxy-omega-dichlor-vinyl-thiosalicylic acid can be obtained as a light crystalline powder.

Example 7: Dissolve thirty and four-fifths (30.8) parts of thiosalicylic acid in eleven and one-fifth (11.2) parts of potassium hydroxid and two hundred (200) parts of alcohol, and then add fifty (50) parts of tribromethylene. After a short time, reaction takes place and the mixture becomes warm. Allow the mixture to stand for several hours, and then add water and hydrochloric acid, whereupon omega-dichrom-vinyl-thiosalicylic acid is precipitated and can be recrystallized from benzene.

If, in the foregoing Example 6, seventeen and nine-tenths (17.9) parts of sulfocyanbenzoic acid be employed, instead of the 4-ethoxy-2-xanthogen benzoic acid, omega dichlor-vinyl-thiosalicylic acid can be obtained.

Now what I claim is:

1. The process of producing omega-dihalogen-vinyl-thiosalicylic acid compounds by acting with trihalogenethylene on a hereinbefore defined thiosalicylic acid compound substantially as described.

2. The process of producing omega-dichlor-vinyl-thiosalicylic acid by acting on thiosalicylic acid with trichlorethylene in the presence of caustic potash.

3. As a new article of manufacture omega-dihalogen-vinyl-thiosalicylic acid compounds which can be obtained by acting with tri-dihalogen-vinyl-thiosalicylic acid compounds thiosalicylic acid compound which new compounds are colorless or only slightly colored, are easily soluble in alcohol and in benzene, more difficultly soluble in ligroin and very difficultly soluble in water, and on treatment with an alkaline condensing agent yield leuco compounds of thioindigo coloring matters.

4. As a new article of manufacture omega-dichlor-vinyl-thiosalicylic acid which consists of colorless crystals which melt at about 173° C., are easily soluble in alcohol and benzene, more difficultly soluble in ligroin, very difficultly soluble in water and on treatment with an alkaline condensing agent gives rise to a leuco compound of a thioindigo coloring matter.

In testimony whereof I have hereunto set my hand in the presence of two subscribing witnesses.

EDUARD MÜNCH.

Witnesses:
J. ALEC. LLOYD,
R. A. SIGSBEE.